US008958809B2

(12) United States Patent
Nama et al.

(10) Patent No.: US 8,958,809 B2
(45) Date of Patent: Feb. 17, 2015

(54) HYBRID COORDINATED SCHEDULING SCHEME FOR USE IN A RADIO ACCESS NETWORK

(71) Applicant: SpiderCloud Wireless, Inc., San Jose, CA (US)

(72) Inventors: Hithesh Nama, San Jose, CA (US); Pete Worters, San Carlos, CA (US)

(73) Assignee: SpiderCloud Wireless, Inc., San Jose, CA (US)

(*) Notice: Subject to any disclaimer, the term of this patent is extended or adjusted under 35 U.S.C. 154(b) by 0 days.

(21) Appl. No.: 13/752,372

(22) Filed: Jan. 28, 2013

(65) Prior Publication Data
US 2014/0213269 A1    Jul. 31, 2014

(51) Int. Cl.
   *H04W 72/00*      (2009.01)
   *H04W 4/00*      (2009.01)
   *H04W 28/16*      (2009.01)
   *H04W 72/12*      (2009.01)

(52) U.S. Cl.
   CPC .......... *H04W 28/16* (2013.01); *H04W 72/1278* (2013.01); *H04W 72/1247* (2013.01)
   USPC .......................................... 455/451; 370/329

(58) Field of Classification Search
None
See application file for complete search history.

(56) References Cited

U.S. PATENT DOCUMENTS

| | | | |
|---|---|---|---|
| 2009/0097444 A1* | 4/2009 | Lohr et al. | 370/329 |
| 2011/0268007 A1* | 11/2011 | Barany et al. | 370/312 |
| 2012/0176884 A1* | 7/2012 | Zhang et al. | 370/203 |

* cited by examiner

*Primary Examiner* — Erika A Washington
(74) *Attorney, Agent, or Firm* — Stuart H. Mayer; Mark D. Wieczorek; Mayer & Williams PC (57) ABSTRACT

A radio access network, such as an LTE E-RAN, employs a hierarchical architecture and includes a services node that provides connectivity between the radio nodes in the RAN and a core network. The RAN employs a hybrid coordinated scheduling scheme in which independent schedulers are running on the services node and the radio nodes. In this way the services node can allocate scheduling resources for some of the UEs in the RAN while the radio nodes can allocate scheduling resources for the remaining UEs in their respective serving cells. In some cases a prioritization approach is used in which the radio nodes do not schedule any radio resources that have already been scheduled by the services node.

27 Claims, 7 Drawing Sheets

HYBRID COORDINATED SCHEDULING SCHEME FOR USE IN A RADIO ACCESS NETWORK

BACKGROUND

Operators of mobile systems such as Universal Mobile Telecommunications Systems (UMTS) are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power. While such small cell RANs operate satisfactorily in many applications, there exists a need for further improvements in small cell RAN technologies.

For example, one problem with small cell RANs is that inter-cell interference prevents these systems from coming close to their theoretical data rates for multi-cell networks. Such interference arises because the same spectral resources are used in different cells, leading to interference for terminals (e.g., User Equipment) located at the edge between cells. Release 11 of the 3GPP Long Term Evolution (LTE) specifications proposes the use of Coordinated Multi-Point (CoMP) technology to mitigate problems caused by inter-cell interference. One aspect of CoMP technology involves the scheduling of time-frequency resources by cells in a cooperative manner. The use of CoMP technology generally comes at the cost of increased demand on the backhaul (high capacity and low latency), higher complexity, increased synchronization requirements and so on.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A radio access network, such as an LTE Enterprise Radio Access Network (E-RAN), employs a hierarchical architecture that includes a services node that provides connectivity between the radio nodes in the RAN and a core network. The RAN may employ a Coordinated Multi-Point (CoMP) scheme in which independent schedulers are running on the services node and the radio nodes. In this way the services node can allocate scheduling resources for some of the UEs in the RAN while the radio nodes can allocate scheduling resources for the remaining UEs in their respective serving cells. In some cases a prioritization approach is used in which the radio nodes do not schedule any radio resources that have already been scheduled by the services node.

In some implementations the central scheduler in the services node may allocate scheduling resources to cell-edge UEs, which may suffer from particularly severe inter-cell interference, while the individual schedulers at each of the radio nodes may allocate scheduling resources to interior cell UEs located in the interior of the cell associated with the respective radio nodes.

The allocation of radio resources in accordance with the schedule determined by the central scheduler in the services node may be communicated to the individual schedulers at each of the radio nodes. On receiving the scheduling allocation for the UEs scheduled from the services node, each individual scheduler can be responsible for resource allocation of all other UEs connected to it while avoiding the resources allocated by the central scheduler to cell-edge UEs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
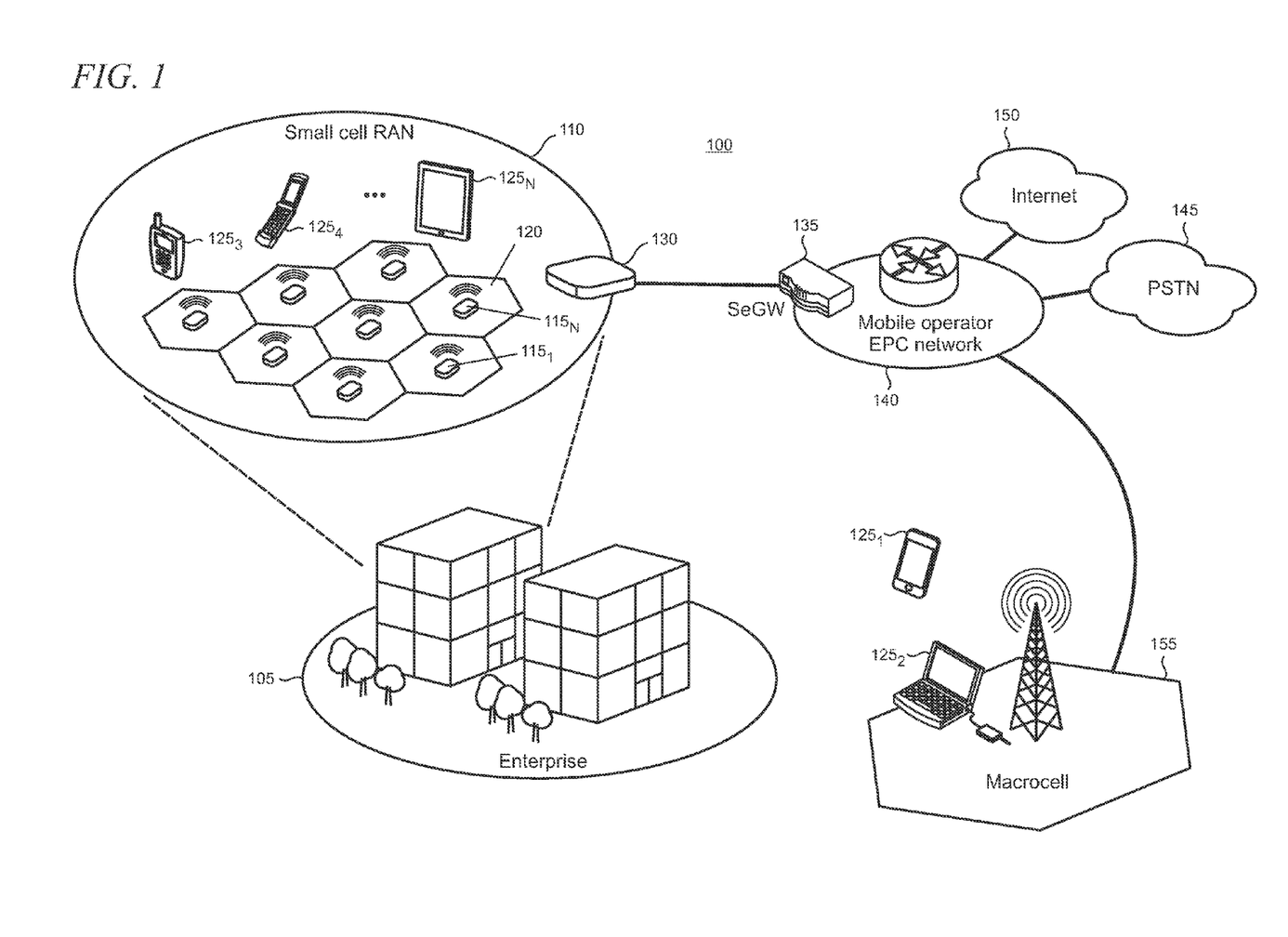
FIG. 1 shows an illustrative mobile telecommunications environment in which the present invention be practiced.

FIG. 1 shows an illustrative mobile telecommunications environment 100 in which the present invention be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. The environment 100 includes an enterprise 105 in which a small cell RAN 110 is implemented. The small cell RAN 110 includes a plurality of radio nodes (RNs) 115₁ ... N. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 125 1-N in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. The services node 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
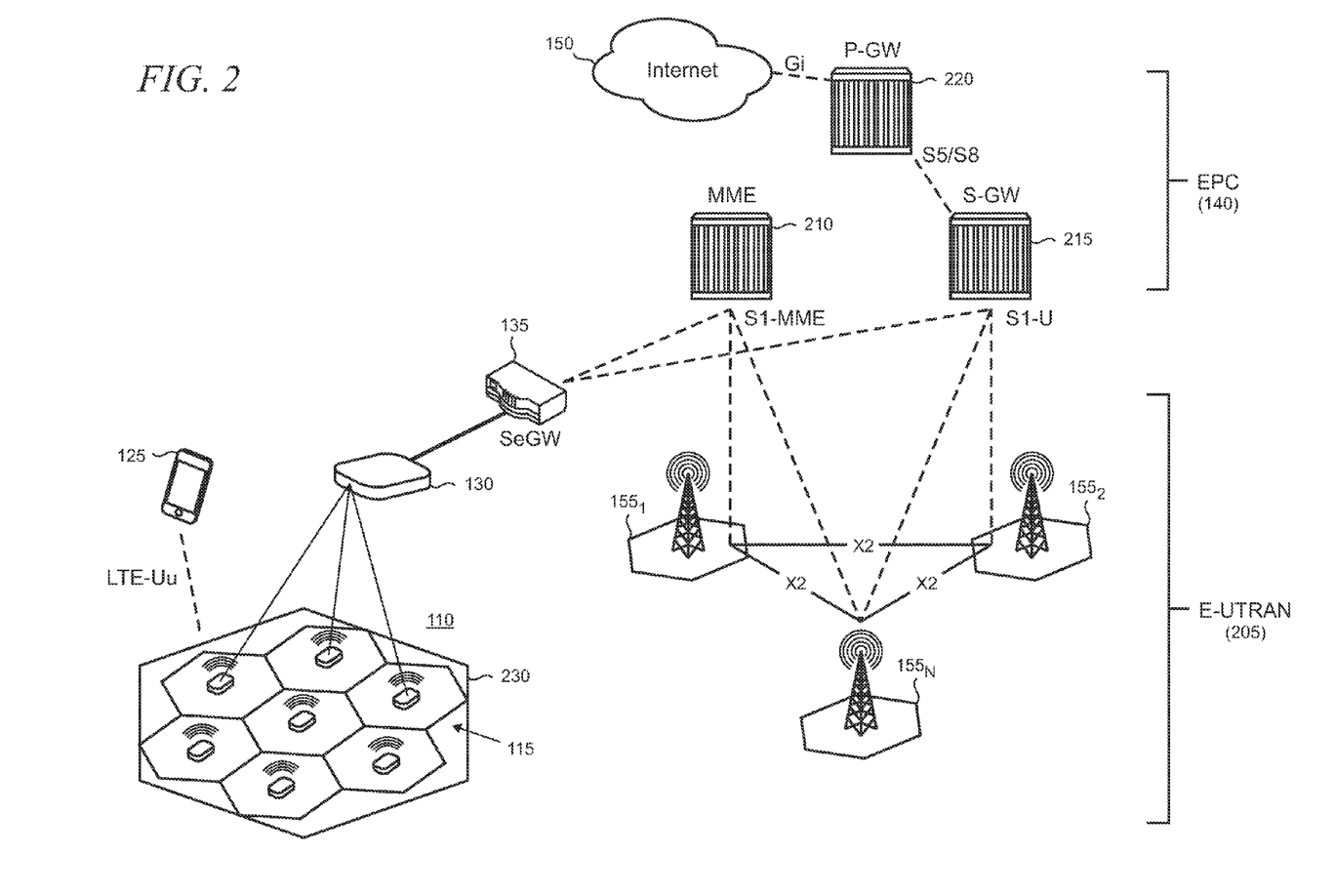
FIG. 2 shows details of an EPC (Evolved Packet Core) and E-UTRAN (Evolved UMTS Terrestrial Radio Access Network where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 2. As shown, there is no centralized controller in the E-UTRAN 205, hence an LTE network architecture is commonly said to be "flat." The macro-cells 155 are typically interconnected using an X2 interface and to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of radio nodes 115 in the small cell RAN 110 is operatively coupled to the services node 130 (as representatively shown by lines 225), the connections from the radio nodes 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears as a single eNB 230 to the EPC 140, as shown.

Figure 3:
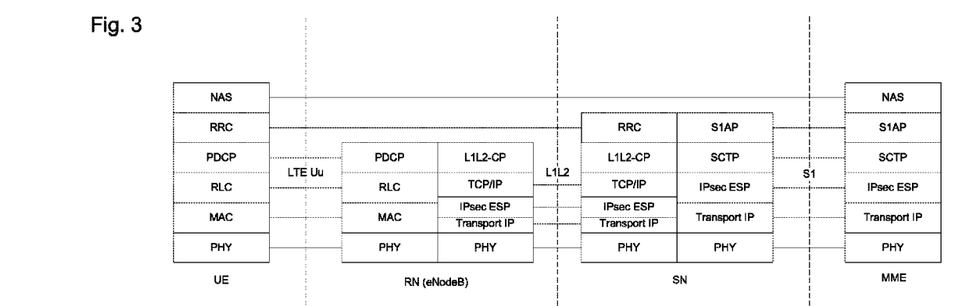
FIGS. 3 and 4 shows one example of a protocol stack that may be employed for the control plane and the user plane, respectively, used in the system of FIGS. 1 and 2 in terms of the OSI (Open Systems Interconnection) model of logical layers.
Figure 4:
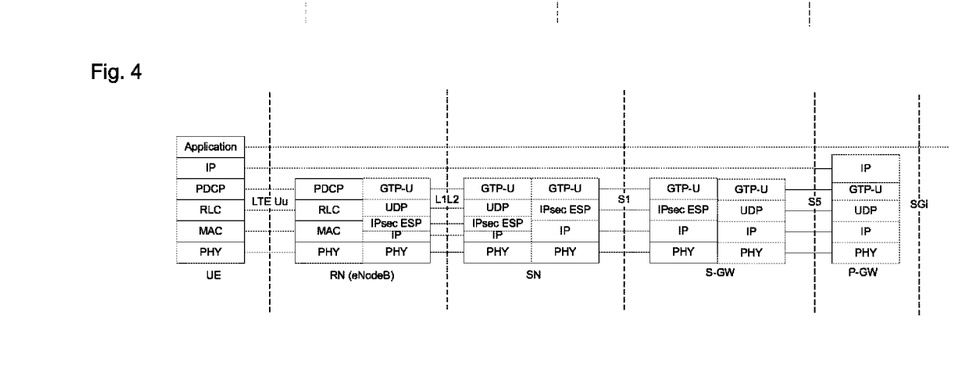

FIGS. 3 and 4 shows one example of a protocol stack that may be employed for the control plane and the user plane, respectively, used in the system of FIGS. 1 and 2 in terms of the OSI (Open Systems Interconnection) model of logical layers. As is known in the art, the Non-Access Stratum (NAS) layer protocol is responsible for signaling and traffic between UE and the network for control purposes such as network attach, authentication, setting up of bearers, and mobility management. The Radio Resource Control (RRC) protocol is responsible for control plane signaling between a UE and the network, i.e. such tasks as broadcast of system information; establishment, maintenance and release of RRC connection; establishment, configuration, maintenance and release of signaling and data radio bearers; security functions including key management; mobility functions such as control of UE cell selection/reselection; paging; UE measurement configuration, processing and reporting; handover; quality of service (QoS) management functions; UE measurement reporting and control of the reporting, but not exclusively. The Packet Data Control Protocol (PDCP) layer is responsible for (de-)compressing the headers of user plane IP packets. The Radio Link Control (RLC) layer is used to format and transport traffic and a Medium Access Control (MAC) layer provides addressing and channel access control mechanisms. The physical (PHY) layer, translates logical communication requests into hardware-specific operations such as modulation, bit synchronization, multiplexing, equalization, forward error correction etc.

Protocol layers that may be employed between the services node 130 and the radio nodes 115 and between the services node 130 and the S-GW215 may include an Internet Protocol (IP) layer, an Internet Protocol Security Encapsulating Security Payload (IPSec ESP) layer for signing and encrypting packets, a user datagram protocol (UDP) and a GPRS Tunneling Protocol-User plane (GTP-U) for creating IP-based tunnels.

As previously mentioned, a major challenge in a multi-cell deployment is cell-edge performance. For instance, a UE at the cell-edge experiences significant interference from the downlink (DL) transmissions of adjacent radio nodes in decoding the DL transmissions from its serving cell. Likewise, uplink transmissions from a cell-edge user can cause significant interference to adjacent radio nodes. As a result the cell-edge spectral efficiency is significantly poorer than that in the interior of the cell. Several coordination mechanisms have been introduced into the LTE standard to improve cell-edge performance.

One such coordination mechanism is Coordinated Multi-Point or CoMP technology, which has been introduced to improve cell-edge spectral efficiency. As previously mentioned, CoMP is included in Release 11 of the 3GPP Long Term Evolution (LTE) specification. These schemes involve coordination among multiple sectors/cells co-located at a single radio node or coordination among geographically separated radio nodes.

The CoMP transmission schemes that have been proposed may be divided into two primary categories: Joint Processing (JP) and Coordinated Scheduling/Beamforming (CS/CB). In joint processing, the data for a UE is available in a given time-frequency resource (e.g., a resource block) from more than one transmitting cell in the set of cells in the CoMP Cooperating Set (CCS).

Joint processing itself can be divided into two categories: Joint transmission and dynamic point selection (DPS)/muting. In joint transmission data is simultaneously transmitted from multiple points to a single UE or multiple UEs in a time-frequency resource to coherently or non-coherently improve the received signal quality and/or data throughput. In DPS/muting, data is transmitted from one cell within the CCS in a time-frequency resource. The transmitting/muting cell may change from one subframe to another and may include variations over resource block pairs within a subframe. The data is available simultaneously at multiple points. Joint processing may also be used for uplink transmission. In particular, data in the Physical Uplink Shared Channel (PUSCH)

transmitted by a UE is received jointly at multiple cells. Combining the received symbols from multiple points results in better uplink decode performance.

In the other primary CoMP transmission scheme, coordinated scheduling/beamforming, data for a UE is only available at and transmitted from one cell in the CCS in a particular time-frequency resource, but user scheduling/beamforming decisions are made with coordination among cells in the CoMP cooperating set. The transmitting cell may be chosen semi-statically. For uplink transmission, user scheduling and precoding selection decisions are made with coordination among multiple cells. However, data is only decoded by one cell. Such coordination can be performed by a scheduler in the radio node. The scheduler is generally a part of the MAC layer in the radio node protocol stack.

In general, coordinated scheduling is used to schedule activities concerning the sharing of radio resources available in the system. Examples of activities that may undergo coordinated scheduling may include, by way of example, selecting a UE for data transmission in a given time subframe or time subslot, assigning a wireless resource location within a subframe (e.g., a time-frequency resource) to the UE for the data transmission, and so on.

In one example, CoMP transmission may improve the received Signal-to-Interference plus Noise Ratio (SINR), and thus, data rate, through enhanced spatial multiplexing or interference reduction through coordinated action by multiple radio nodes. However, such coordination typically requires tight synchronization and message exchanges among the coordinating radio nodes.

Figure 5:
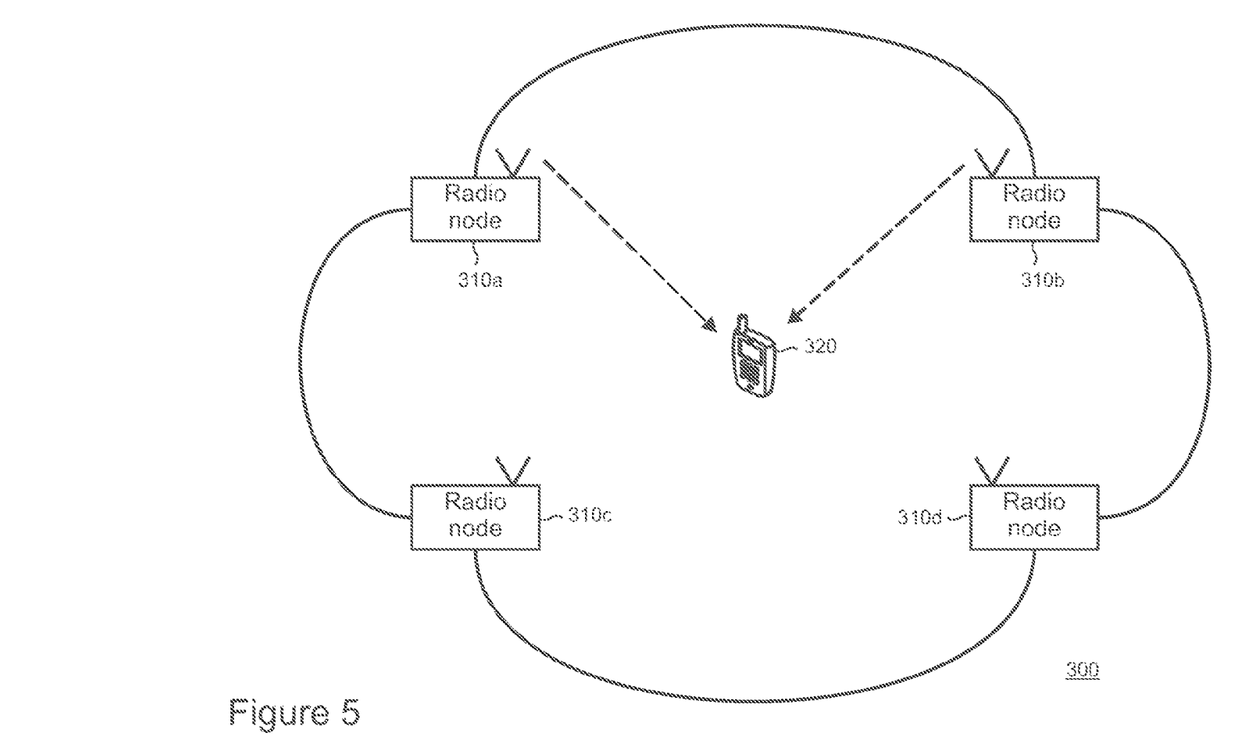
FIG. 5 illustrates an example coordinated multi point (CoMP) scenario with multiple radio nodes transmitting to a UE.

FIG. 5 illustrates an example coordinated multi point (CoMP) scenario 300 with multiple radio nodes transmitting to a UE 320. The multiple radio nodes 310a, 310b, 310c, 310d are capable of communicating with each other as indicated by the lines connecting them. In one embodiment, each of the radio nodes can communicate with any of the other radio nodes. For example, the radio node 310a is capable of communicating with any of the radio nodes 310b, 310c, and 310d. One skilled in the art would understand that the number of radio nodes and UEs are shown for illustration only and are not a limitation on the scope of the present disclosure.

Figure 6:
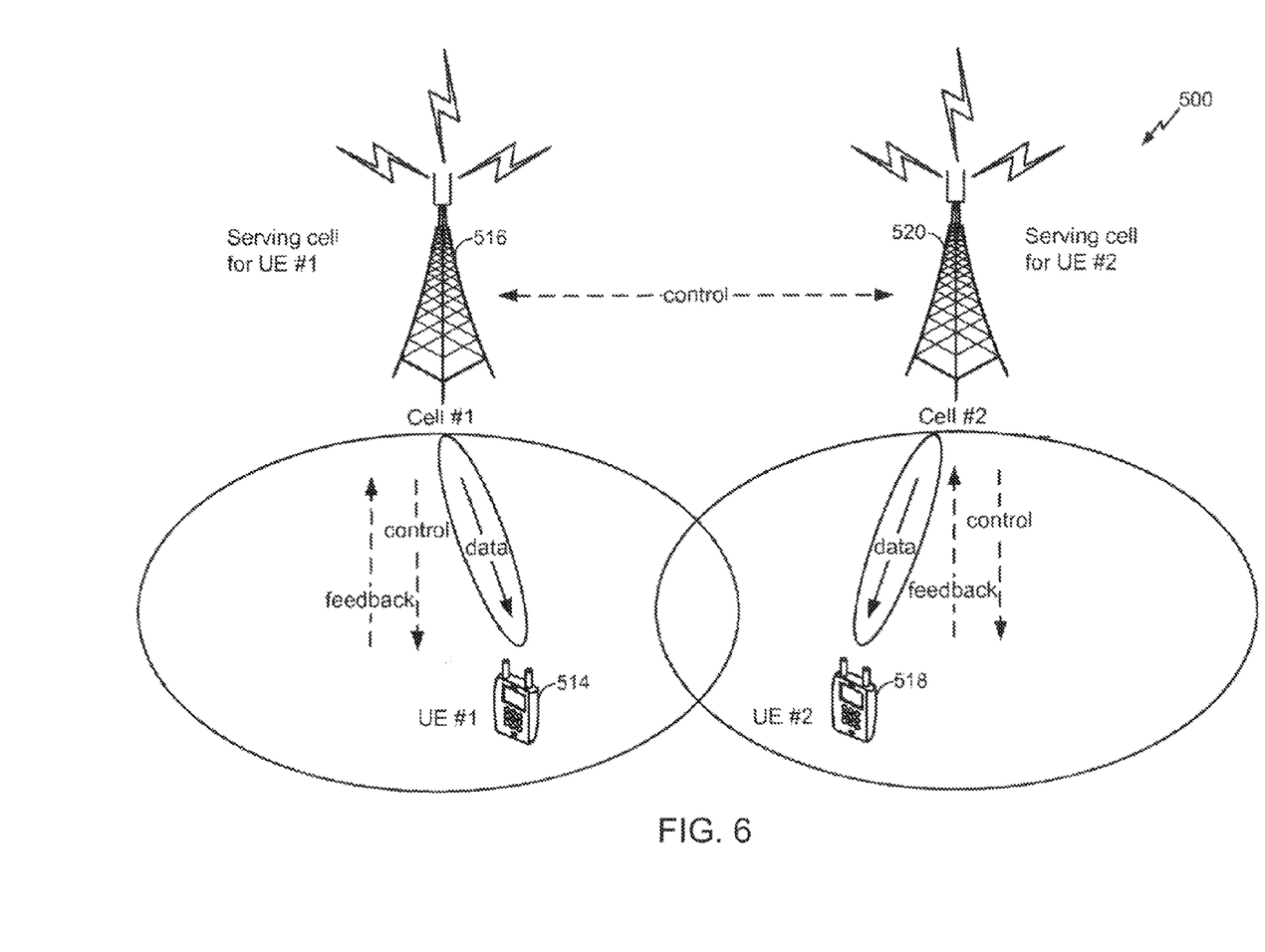
FIG. 6 illustrates an example downlink CoMP transmission scenario with coordinated scheduling/beamforming (CS/CB).

FIG. 6 illustrates an example downlink CoMP transmission scenario with coordinated scheduling/beamforming (CS/CB). In the example system 500, transmission is provided by radio nodes 516 and 520 to UEs 514 and 518 respectively. In this example, only control information is transmitted between the two radio nodes 516 and 520. In particular, scheduling data for the UEs 514 and 518 is sent back and forth between the radio nodes 516 and 520 in order to determine the appropriate beam formation. For example, this allows for narrow beam configuration to reduce or minimize interference. Uplink CoMP transmission operates in an analogous manner.

CoMP communication techniques generally require a high degree of information sharing among cells involved in, or affected by interference from the CoMP communication. This high degree of coordination is believed to be needed because transmissions concurrently sent by multiple cells can potentially increase both the amount of network interference and the scope of the network interference, thereby affecting a larger number of UEs over a greater geographical region.

If a set of cells are conducting multiple CoMP transmissions in a single subframe, the overall interference for the set of cells and for surrounding cells can be a complex function, rendering conventional interference mitigation techniques difficult, e.g., isolated or coordinated beamforming, signal cancellation, transmit power reduction, channel prediction and resource selection, etc., and on a network-wide basis, prohibitively so.

Furthermore, the degree of information sharing employed by CoMP transmission techniques may require several information hops—one-way exchanges of data between cells—to achieve sufficient channel gain to make the CoMP communication worthwhile. At a minimum, information shared between cells adds overhead on the backhaul network coupling the cells, reducing the efficacy of the wireless network. In addition, larger numbers of information hops can add significant delay, depending on latency of the backhaul network. Increased delay further reduces wireless efficacy.

These problems can be addressed by leveraging the architecture shown in FIGS. 1 and 2, which has a RAN 110 that employs a services node 130. In particular, instead of simply allowing the schedulers in the radio nodes to perform coordinated scheduling, a hybrid scheduling approach may be employed with a central scheduler hosted on the services node 130. The central scheduler may be used in addition to and in conjunction with the individual schedulers within the MAC layer at each radio node. Such a scheme may be referred to as a hybrid coordinated scheduling scheme. The central scheduler may be a part of the MAC layer in the protocol stack for the services node 130 shown in FIGS. 3 and 4.

The central scheduler hosted on the services node 130 may obtain input information from a variety of sources to perform its scheduling tasks. For example, for each UE, information concerning its serving radio node, the detected set of radio nodes, and possibly the downlink/uplink buffer status may be employed. In addition, the channel state information for certain UEs, if available, may also be employed. Using this input information, the central scheduler can determine the schedule for individual UEs such as all cell-edge UEs, for example. More particularly, the central scheduler may be used to determine the schedule for cell-edge UEs that are receiving a service that is delivered at a periodic rate and which has a very poor delay tolerance, such as voice-over-IP (VOIP), for example. Alternatively, or in addition thereto, the central scheduler may be used to determine the schedule for cell-edge UEs with certain Quality of Service (QoS) characteristics while best effort traffic is scheduled from the individual radio nodes.

The hybrid coordinated scheduling scheme described herein may be used in conjunction with other mechanisms that are designed to improve cell-edge performance. For example, Fractional Frequency Reuse (FFR) schemes have been proposed in which cell-edge UEs in adjacent cells use non-overlapping resource blocks. If such an FFR allocation scheme is employed in conjunction with hybrid scheduling, the central scheduler can be responsible for scheduling all cell-edge UEs within the allocated frequencies or resource blocks in a coordinated manner. Moreover, interference graphs which may be constructed to assist with the frequency allocation may also be used by the central scheduler when allocating radio resources.

The allocation of radio resources in accordance with the schedule determined by the central scheduler may be communicated to the individual schedulers at each radio node. On receiving the scheduling allocation for cell-edge UEs, each individual scheduler can be responsible for resource allocation of all other UEs connected to it while avoiding the resources allocated by the central scheduler to cell-edge UEs. That is, in some implementations the central scheduler may be given priority in scheduling radio resources for UEs and the individual radio node schedulers would be required to schedule radio resources in a way that does not conflict with the scheduling of resources by the central scheduler in the services node 130.

In addition to using the central scheduler to allocate resources for the Physical Downlink Shared channel (PDSCH), the Physical Uplink Shared Channel (PUSCH) and the Physical Uplink Control Channel (PUCCH), the central scheduler can be used to allocate resources for the Physical Downlink Control Channel (PDCCH) in a centralized manner, especially for cell-edge UEs. The position in the frequency domain of a PDCCH transmission to a UE is a function of its Radio Network Temporary Identifier (RNTI). In a RAN with time-synchronized radio nodes, PDCCH collisions can be avoided for cell-edge UEs by ensuring that there is no overlap of PDCCHs being transmitted from different radio nodes.

As part of the scheduling process the system can determine the relative position of each active UE based on measurement reports received from the UE. If a UE is determined to be in an area of poor signal quality, and if it is determined that it is necessary to put the UE into a CoMP mode of operation in order to provide the required QoS characteristics, the RAN can start processing the UE's data at the services node. In this case the services node can allocate scheduling resources on each radio node at a future time (e.g., more than 'D' milliseconds after the current time instant 't'). This allocation of scheduling resources is then signaled to the radio node.

Figure 7:
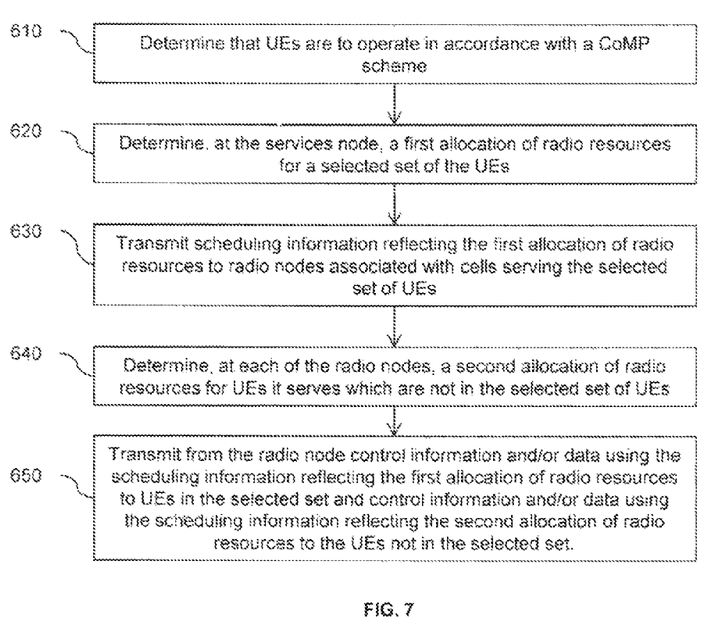
FIG. 7 is a flowchart showing one example of a method for allocating radio resources in a RAN.

FIG. 7 is a flowchart showing one example of a method for allocating radio resources in a RAN. The RAN includes a series of radio nodes each associated with a cell and a services node operatively coupled to the radio nodes. The method begins at block 610 when the services node determines that UEs each being serviced by a selected one of the cells are to operate in accordance with a CoMP scheme. The cells belong to a CoMP cooperating set. At block 620 the services node determines a first allocation of radio resources for a selected set of the UEs. At block 630 the services node transmits scheduling information reflecting the first allocation of radio resources to one or more radio nodes associated with one or more cells serving the selected set of UEs. Each of the radio nodes receiving the scheduling information determines at block 640 a second allocation of radio resources for one or more UEs it serves which are not in the selected set of UEs. At block 650 the radio node transmits control information and/or data using the scheduling information reflecting the first allocation of radio resources to UEs in the selected set being serviced by the radio node and control information and/or data using scheduling information reflecting the second allocation of radio resources to the one or more UEs served by the radio node which are not in the selected set of UEs.

Figure 8:
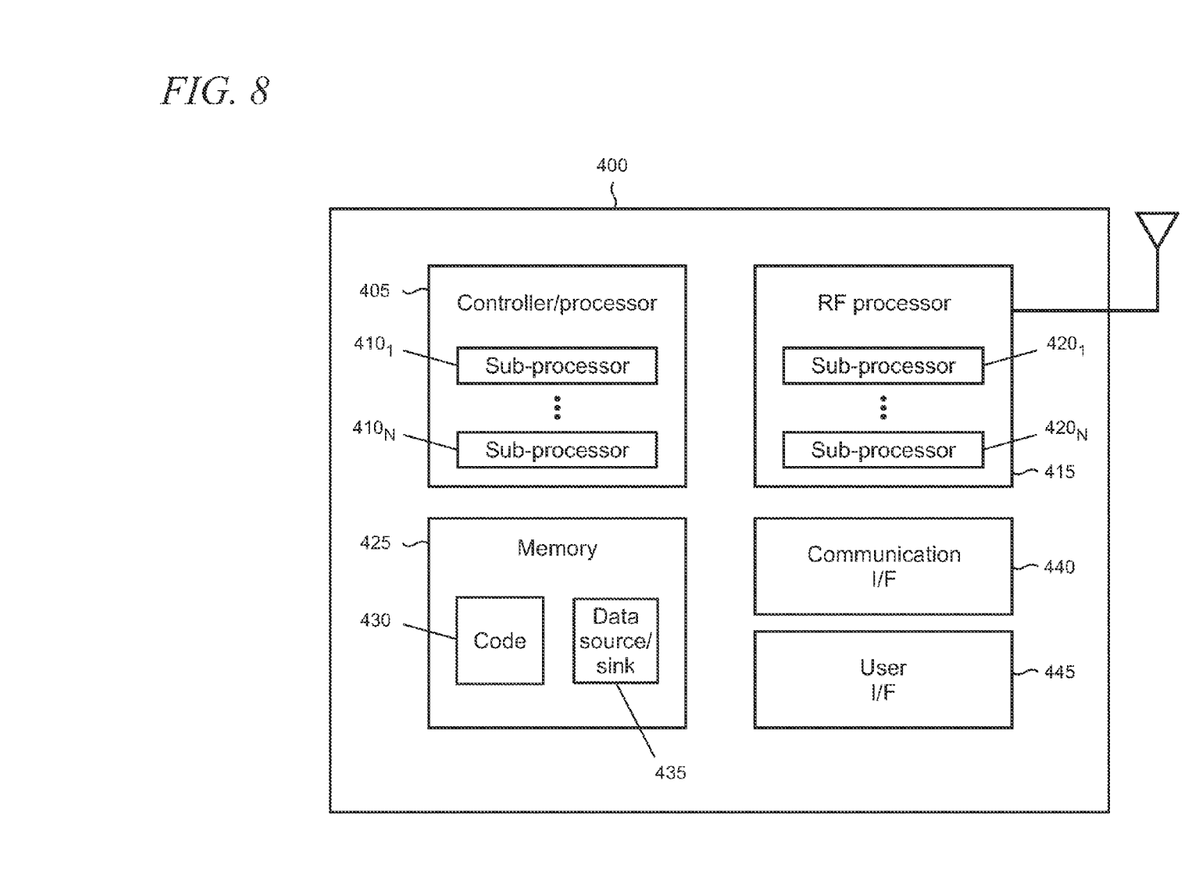
FIG. 8 shows a simplified functional block diagram of illustrative hardware infrastructure for a radio node that may be utilized to implement the present hybrid coordinated scheduling scheme.

FIG. 8 shows a simplified functional block diagram 400 of illustrative hardware infrastructure for a radio node that may be utilized to implement the present hybrid coordinated scheduling scheme. A controller/processor 405 typically handles high level processing. The controller/processor 405 may include one or more sub-processors 410 or cores that are configured to handle specific tasks or functions. An RF processor 415 implements various signal processing functions for the downlink including the lower level L1 processing. The RF processor 415 may include one or more sub-processors 420 or cores that are configured to handle specific tasks or functions. A memory 425 stores computer-readable code 430 that is executable by one or more processors in the controller/processor 405 and/or the RF processor 415. The memory 425 may also include various data sources and data sinks (collectively represented by element 435) that may provide additional functionalities. The code 430 in typical deployments is arranged to be executed by the one or more processors to implement the hybrid coordinated scheduling scheme by modifying the MAC layer channels in order to distribute the scheduling functionality between the radio node and the services node.

The hardware infrastructure may also include various interfaces (I/Fs) including a communication I/F 440 which may be used, for example, to implement a link to the services node 130 (FIG. 1), LAN, or to an external processor, control, or data source. In some cases, a user I/F 445 may be utilized to provide various indications such as power status or to enable some local control of features or settings. It is noted that the block diagram 400 may also be substantially applicable to a services node that may be utilized to implement the present CoMP scheme. More particularly, the RF processor 415 may be eliminated in some applications and any functionality that it provides that is needed to implement the services node may be provided by the controller/processor 405.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer- readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of allocating radio resources in a radio access network (RAN) that includes a plurality of radio nodes each associated with a cell and a services node operatively coupled to the radio nodes, the services node providing connectivity to a core network, comprising:
   determining that UEs (User Equipment) each being serviced by one of the cells are to operate in accordance with a hybrid coordinated scheduling scheme, the cells being associated with the radio nodes belonging to a cooperating set;
   determining a first allocation of radio resources at the services node for a selected set of the UEs; and
   transmitting scheduling information reflecting the first allocation of radio resources to one or more radio nodes associated with one or more cells serving the selected set of UEs;
   determining a second allocation of radio resources at one or more of the radio nodes for at least one UE not in the selected set of UEs; and
   transmitting from the radio node control information and/or data using the scheduling information reflecting the first allocation of radio resources to UEs in the selected set being serviced by the radio node and control information and/or data using scheduling information reflecting the second allocation of radio resources to the at least one UE not in the selected set of UEs.

2. The method of claim 1 wherein the selected set of UEs receiving the control information and/or data using scheduling information from the services node are cell-edge UEs located at a cell edge and the UE not in the selected set is an interior cell UE located in the interior of a cell associated with the radio node.

3. The method of claim 2 wherein the cell-edge UEs are allocated radio resources in accordance with a Fractional Frequency Reuse (FFR) scheme.

4. The method of claim 1 wherein the radio resources allocated by the services node has priority over radio resources allocated by the radio node.

5. The method of claim 1 wherein the radio resources being allocated include a time-frequency resource.

6. The method of claim 1 wherein the radio resources being allocated by the services node are allocated to a Physical Downlink Shared channel (PDSCH).

7. The method of claim 1 wherein the radio resources being allocated by the services node are allocated to a Physical Downlink Control Channel (PDCCH).

8. The method of claim 1 wherein the radio resources being allocated by the services node are allocated to a Physical Uplink Shared Channel (PUSCH).

9. The method of claim 1 wherein the one or more radio nodes are eNodeBs.

10. The method of claim 1 wherein the selected set of UEs receiving an allocation of resources determined by the services node are receiving a voice-over-IP (VOIP) service.

11. The method of claim 1 wherein the selected set of UE receiving the first allocation of resources determined by the services node are supporting traffic with a specified Quality of Service (QoS) and the UE receiving the second allocation of resources determined by the radio node support best effort traffic.

12. One or more non-transitory computer-readable media containing instructions which, when executed by one or more processors disposed in an electronic device, implement a method of operating a radio node in a radio access network (RAN) that includes a plurality of radio nodes and a services node operatively coupled to the radio nodes, the services nodes providing connectivity to a core network, the method comprising:
   receiving a first set of scheduling information from the services node for selected UEs serviced by a radio node, wherein UEs being serviced by the radio node are to operate in accordance with a hybrid coordinated scheduling scheme, the radio node being associated with a cell that belongs to a cooperating set of cells; and
   transmitting control information and/or data using the first set of scheduling information to the selected UEs and transmitting control information and/or data using a second set of scheduling information to remaining UEs being serviced by the radio node.

13. The computer-readable media of claim 12 wherein the second set of scheduling information is determined by the radio node.

14. The computer-readable media of claim 12 wherein the selected UEs receiving the control information and/or data using the first set of scheduling information are cell-edge UEs located at a cell edge and the remaining ones of the UEs are interior cell UEs located in the interior of the cell associated with the radio node.

15. The computer-readable media of claim 14 wherein the cell-edge UEs are allocated radio resources in accordance with a Fractional Frequency Reuse (FFR) scheme.

16. The computer-readable media of claim 12 wherein the first set of scheduling information has priority over the second set of scheduling information.

17. The computer-readable media of claim 12 wherein the first and second sets of scheduling information allocate radio resources that include a time-frequency resource.

18. The computer-readable media of claim 12 wherein the first and second sets of scheduling information allocate radio resources that includes a Physical Downlink Shared channel (PDSCH).

19. The computer-readable media of claim 12 wherein the first and second sets of scheduling information allocate radio resources that includes a Physical Uplink Shared Channel (PUSCH).

20. The computer-readable media of claim 12 wherein the first and second sets of scheduling information allocate radio resources that includes a Physical Uplink Control Channel (PUCCH).

21. The computer-readable media of claim 12 wherein the selected UEs receiving the first set of scheduling information are receiving a voice-over-IP (VOIP) service.

22. The computer-readable media of claim 12 wherein the selected UEs receiving the control information and/or data using the first set of scheduling information are supporting traffic with a specified Quality of Service (QoS) and the remaining ones of the UEs support best effort traffic.

23. A radio node operable in a cell in a small cell radio access network (RAN), comprising:
   one or more processors;
   an RF (radio frequency) transceiver operatively coupled to the one or more processors and arranged for bidirectional communications with a plurality of UEs (user equipment); and memory operatively coupled to the one more processors, the memory storing computer-readable instructions which, when executed by the one or more processors, implement a method comprising:

determining a first set of scheduling information for a selected set of the UEs, the selected set of UEs being a subset of the plurality of UEs and excluding UEs that operate in accordance with a second set of scheduling information determined by a services node operatively coupled to radio nodes in the small cell RAN, the services node providing connectivity to a core network; and transmitting control information and/or data using the first set of scheduling information to the selected set of the UEs.

24. The radio node of claim 23 wherein the selected set of UEs are interior cell UEs located in the interior of the cell associated with the radio node and the UEs operating in accordance with the second set of scheduling information determined by the services node are edge-cell UEs located at a cell edge.

25. The radio node of claim 23 wherein the second set scheduling information determined by the services node has priority over the first set of scheduling information determined by the radio node.

26. The radio node of claim 23 wherein the scheduling information allocates radio resources that include a time-frequency resource.

27. The radio node of claim 23 wherein the selected set of UEs support best effort traffic and the UE receiving the second set of scheduling information determined by the services node support traffic with a specified Quality of Service (QoS).

* * * * *